United States Patent [19]

Glier

[11] Patent Number: 4,755,937
[45] Date of Patent: Jul. 5, 1988

[54] METHOD AND APPARATUS FOR HIGH BANDWIDTH SHARED MEMORY

[75] Inventor: Michael T. Glier, Chepachet, R.I.

[73] Assignee: Prime Computer, Inc., Natick, Mass.

[21] Appl. No.: 829,329

[22] Filed: Feb. 14, 1986

[51] Int. Cl.⁴ .............................................. G06F 13/00
[52] U.S. Cl. ................................................... 364/200
[58] Field of Search ........................ 364/200 MS File; 365/189, 221

[56] References Cited

U.S. PATENT DOCUMENTS

| | | | |
|---|---|---|---|
| 4,034,347 | 7/1977 | Probert, Jr. ........................ | 364/200 |
| 4,212,057 | 7/1980 | Devlin et al. ....................... | 364/200 |
| 4,347,587 | 8/1982 | Rao ..................................... | 365/189 |
| 4,384,324 | 5/1983 | Kim et al. ........................... | 364/200 |
| 4,394,730 | 7/1983 | Suzuki et al. ...................... | 364/200 |
| 4,491,909 | 1/1985 | Shimizu ............................. | 364/200 |

*Primary Examiner*—Thomas M. Heckler
*Attorney, Agent, or Firm*—Wolf, Greenfield & Sacks

[57] ABSTRACT

A method and apparatus for providing high speed communications with a shared memory from both a processing control unit and a plurality of auxiliary processing devices employs a video random access memory. The processing control unit or units require random access of the memory and are operatively connected to a random access port of the video random access memory. Each auxiliary processing device is operatively connected for data transfer in a burst mode to a serial access port of the video random access memory. The method and apparatus control transfer of data to and from the serial and random access ports for effecting high speed communications at both I/O access ports of the memory. Data communication at the serial access port is in a bit serial/word parallel burst mode and occurs in one CPU cycle. The memory operates like a dynamic RAM from the random access port.

11 Claims, 2 Drawing Sheets

METHOD AND APPARATUS FOR HIGH BANDWIDTH SHARED MEMORY

The invention relates generally to a method and apparatus for sharing a common memory, and in particular, to a method and apparatus for providing a high speed, high bandwidth performance for a memory accessible by a plurality of high speed digital input/output devices.

BACKGROUND OF THE INVENTION

Conventional memory architectures which use a common memory shared by multiple input/output devices, including central processing units (CPU's), which require random access of the memory, generally provide insufficient memory bandwidth to allow each device to communicate, and hence to operate, at peak performance. This condition occurs because the bandwidth available for communicating with the memory must be divided among the various input/output devices and processors to allow each device to access the memory. The memory, having a peak operating throughput, simply cannot communicate fast enough, that is, it does not have a high enough communications bandwidth to allow all of the devices connected to it to perform at their maximum rated specifications.

The traditional solutions to this problem have been many and include, for example, memory caching wherein each input/output device and/or CPU is provided with cache memory for data or instructions, interleaving the memories, bank switched memories, the use of a page mode or static column access memory, the use of time-sharing or time-slicing techniques to provide access to the common memory; and the use of separate buffer memories for use by the input/output devices as an intermediate storage. Each of these solutions has always required various forms of data and address path sharing and address generation by the central processing unit (CPU) of the apparatus. In addition, all of the methods require contention resolution or arbitration between devices vying for use of the memory element.

In a typical example, a digital controller system can require an estimated peak memory bandwidth of 30 megabytes per second. The requirement may be distributed between (a) a processor which can transfer data, in the burst mode, at 20 megabytes per second, (b) two independent disk drive input/output devices which have a peak data rate of 3 megabytes per second per port, and (c) an 8 megahertz 80286 microprocessor which requires an estimated bandwidth on the order of 4 megabytes per second, assuming no wait states and/or continuous program execution. Such overal memory bandwidth requirements are beyond that available by typical dynamic or static random access memories (RAM's).

It is therefore, an object of the invention to provide high bandwidth in a shared memory environment which allows high performance CPU's and high performance input/output (I/O) devices to operate with a shared memory while maintaining high operating performance. Other objects of the invention are a method and apparatus for increasing performance of a digital processing system, for providing improved data transmission between auxiliary devices and the shared memory, for improving access by a central processing unit to a shared memory, for reducing the overall cost and increasing the reliability of a shared memory digital processing system, and reducing contention and priority problems in a high performance digital processing system.

SUMMARY OF THE INVENTION

The invention relates to a method and apparatus for providing high speed data communications with a shared memory by a processing control unit and at least one auxiliary processing device. The processing control unit requires random access of the memory. The method features the steps of connecting the processing control unit to a random access port of a video random access memory (VRAM); connecting each auxiliary processing device to a serial access port of the video random access memory; and controlling access to the video random access memory by the processing control unit and each auxiliary processing I/O device for effecting high speed data communications with both the random access and serial ports. In a particular aspect of the method, there is further featured the step of determining the priority of attempts by various elements to access the shared memory. As an example, access by the processing control unit through the random access port can have the highest priority.

The apparatus of the invention features circuitry for operatively connecting the processing control unit to a random access port of a video random access memory (VRAM), circuitry for operatively connecting each auxiliary processing device to a serial access port of the VRAM, and further, circuitry for controlling access to the VRAM by the processing control unit and each auxiliary processing device for effecting high speed communications at both the random access and serial ports. In a preferred aspect, the apparatus further features circuitry for determining priority of access to the memory by the processing control unit and the plurality of auxiliary devices.

BRIEF DESCRIPTION OF THE DRAWINGS

Other objects, features, and advantages of the invention will appear from the following description of particular preferred embodiments, taken together with the drawings in which.

DESCRIPTION OF PARTICULAR PREFERRED EMBODIMENTS

Figure 1:
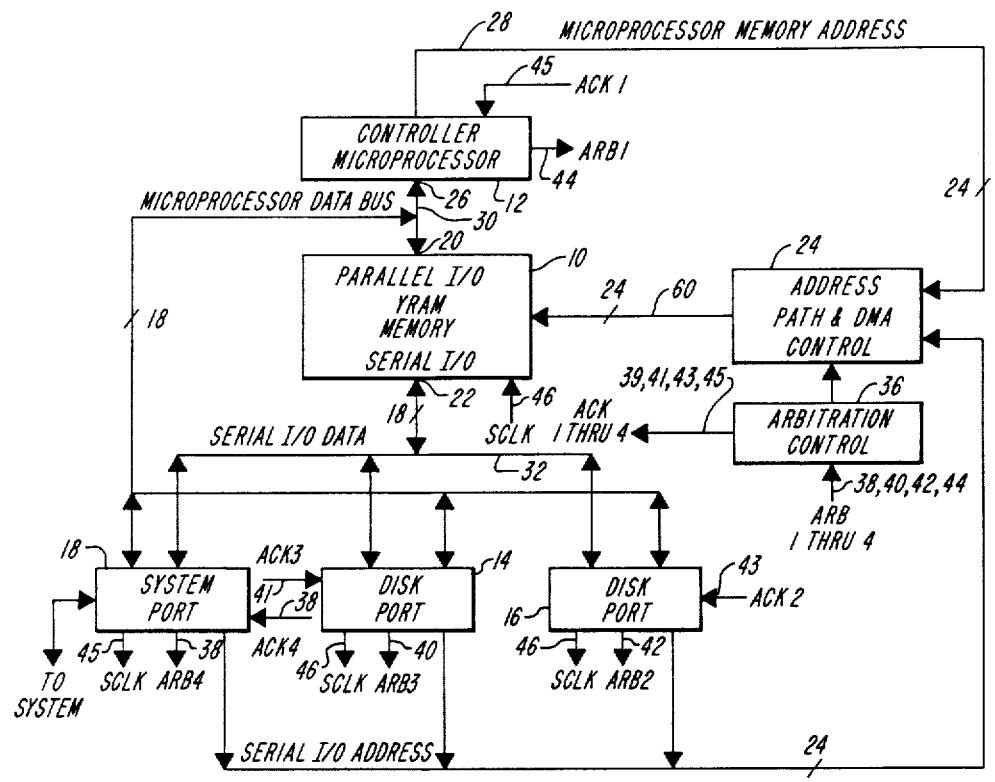
FIG. 1 is an electrical schematic block diagram of a preferred embodiment using a VRAM as the shared memory in accordance with the invention.

Referring to FIG. 1, a microprocessor controlled data processing system has a memory 10 which can be accessed by both a controller microprocessor 12 requiring random access of the memory and any of a plurality of auxiliary processing devices such as disk controllers 14, 16 or other auxiliary devices operating through a system port such a port 18. The memory 10 according to the invention, is a video random access memory (VRAM) which has a random access input/output (I/O) port 20 and a serial access input/output (I/O) port 22. As is well known in the art, the memory, when "viewed" at port 20, appears to be a typical dynamic RAM. The same memory however, when viewed at serial input/output port 22, appears to be a sequential access static RAM. In accordance with the preferred embodiment of the invention, a direct memory access (DMA) controller and address path specifier circuit 24 controls the addressing of the VRAM and provides circuitry for determining message ending conditions and for recognizing row/column boundary condition overflow.

The controller microprocessor has a data input/output port 26 and provides for a memory location address output via microprocessor memory address data bus, lines 28. The data transfer between the random access input/output port 20 and microprocessor input/output port 26 is bidirectional and lines 30 connecting the two ports are designated as the microprocessor data bus. The microprocessor memory address bus 28 provides data address information to the DMA and address path controller 24, identifying the address at which a word of data is to be transfered into, or read from, memory 10.

Each of the auxiliary devices, in accordance with the illustrated embodiment of the invention, connects to the microprocessor data bus and can read from or transfer data to that bus. In addition, each auxiliary device also connects to the serial input/output data bus 32 which connects to the serial input/output port 22 of the VRAM 10. Data communication on bus lines 32 is bidirectional.

The auxiliary devices access memory 10 in a bit serial/word parallel fashion. In accordance with the illustrated embodiment of the invention, data is transferred through the serial input/output memory port, that is, input to or output from the serial input/output port 22, in a burst mode of operation. Priority among the various devices which may contend for the bus is determined by an arbitration control circuitry 36. The arbitration controller 36 receives requests from the auxiliary devices (and the control processor) and defines, according to a selected priority, which of the auxiliary devices and the microprocessor controller need servicing. For example, the circuitry can service the ports on a first come, first served basis, or the device connected to the parallel port can have highest priority. The arbitration circuitry request signals are available over arbitration control lines 38, 40, 42, and 44. The arbitration circuitry acknowledges a valid request over acknowledge lines 39, 41, 43, and 45.

Each auxiliary device also provides its own system clock signal to the VRAM over lines 46, for example, to synchronize data transfer in the burst mode.

The operation of the shared memory system in accordance with the preferred embodiment of the invention centers around the VRAM 10. The VRAM can be any of several commercially available elements, such as the Fujitsu model No. MB81461-12 or the Advanced Micro Devices model No. AM90C644. The memory can be organized, for example, to be 1.024 megabits deep by 18 bits wide. This would require a plurality of memory chips connected for word parallel access as is well known in the art. Two bits of each word provide byte wide parity support for a single bit error detection. There is, of course, no limitation on memory width using this design approach. However, additional memory width would incur a penalty in added design complexity for the bit/word alignment and management between various input/output devices.

The data transfer between the auxiliary input/output devices such as disk controllers 14 or 16 and the VRAM is managed in block form using the DMA control logic 24. The VRAM appears to the auxiliary device to be a large sequential memory organized to accept or transmit data in a bit serial, word parallel manner. As the data access to the VRAM's serial port 22 is sequential, the address of each DMA controlled data transfer is required only at the beginning and/or end of a data operation (or when a column or row boundary is exceeded). Accordingly therefore, significant savings in address overhead requirements can be achieved over typical data transfer available through the random access memory input/output port 20 wherein an address destination is required for each read or write of a word from or to memory.

Since the address bus 60 from the DMA controller 24 is common for both the random access and serial ports, the arbitration controller logic circuitry 36 manages the memory contention access, as noted above. The arbitration control logic controls the address path multiplexor circuitry 24, which is enabled to the input/output device side only at the start of a data transfer operation, that is, when an address is available to increment to a new row address, or if the operation is a write to the VRAM 10. The use of a separate (as opposed to a three state) address path allows for conventional DMA address control cycles to occur on the address bus for each data transfer. This is well known to those practiced in the art, and is a characteristic of the devices used and described herein. The unnecessary address cycles are simply ignored by the arbitration control logic 36.

In accordance with the preferred embodiment of the invention, each auxiliary device 14, 16, 18 attached to the serial I/O data port 22 of the VRAM provides data buffering therein to allow for burst mode transfers between the device and the memory. This allows also for device port service latency timing. Each port further contains a DMA controller to manage address generation for all data transfers to the serial port of memory 10. A starting address and a count for each transfer is provided by the controller microprocessor 12 which each DMA uses as initialization data for transfer operations. Interrupts from the DMA controller to the logic blocks of the central processing unit provide a method for status passing.

Accordingly, a burst of data from an auxiliary device to the VRAM can be stored in the VRAM by utilizing only one CPU cycle. Thus, an entire row of data can be transferred to or from the VRAM dynamic storage array in one CPU cycle instead of, for example, two hundred CPU cycles (one cycle per word).

The ability to write large blocks of data in one CPU cycle in a VRAM has the further advantage of allowing a plurality of CPU systems to access each other's memory. Thus, referring to FIG. 2, two microprocessor based CPU systems 100, 102 operate to read and write data into and out of their own and the other CPU systems's respective video RAM. Each CPU system in FIG. 2 has substantially the same configuration as the CPU system of FIG. 1. For ease of comparison, like components in FIG. 2 have been labeled with the same reference numerals used in FIG. 1, followed by either the suffix "a" for CPU system 100 or the suffix "b" for CPU system 102. Within each CPU system, the controller 12a, 12b accesses solely their own respective VRAM 10a, 10b, through the respective parallel input ports 20a, 20b. The address path and DMA control circuitries 24a, 24b, now receive an additional address input from the address path and DMA control circuitry output of the other CPU system over lines 104b, 104a respectively. In operation, each controller 12a, 12b, provides a remote request line 106a, 106b to the arbitration logic 36b, 36a of the other system. In this manner, controller 12b, for example, can request through arbitration logic 36a that the data available from system port 14b, be stored in VRAM 10a.

In order to control the passage of data on serial I/O data buses 110a, 110b connecting of the respective systems, a remote access control circuitry 112, in essence a multiplexer, provides an output signal to control the flow of data through a bidirectional serial bus path controller 114. The path controller 114 interconnects the serial data buses 110a, 100b in one mode of operation and isolates said buses 110a, 110b in a second mode of operation. Arbitration logic 36a acknowledges a request for access to VRAM 10a from controller 12b over a remote request acknowledge line 116a. The remote acknowledge line 116a is directed to both the remote controller, here controller 12b, and to the remote access controller 112. In response to the remote acknowledge signal, controller 112 allows data to be transmitted to and from the selected one of ports 14b and 18b to parallel port 22a along I/O data bus 110a. Ports 18a and 14a can also communicate with ports 14b and 18b in this mode of operation. Similarly, when a remote request acknowledge signal over line 116b is received by controller 12a from the arbitration logic 36b in response to a remote arbitration request signal over line 106a, the remote access controller 112, which also receives the signal over line 116a, causes data from the auxillary device ports of microprocessor system 100 over the serial I/O bus to be made available to the VRAM 10b and auxillary device ports 14b, 18b. Since the path controller 114 is bidirectional, both the read and write operations can take place. Thus, disk controller 14a, can interconnect to transfer data to the memory 10b at its serial I/O port 22b. The device ports 14a, 18a, and 14b, 18b similar to controllers 14 and 16 of FIG. 1, each have buffer memories to provide for burst mode transfers of data to and from the VRAM's. The address path and DMA control circuitries 24a, 24b, similar in function to circuitry 24, operate to provide address data over common address paths 110a, 110b, respectively. The arbitration control elements 36a, 36b are available for determining priority of access to their respective shared memory by the contending devices.

Figure 2:
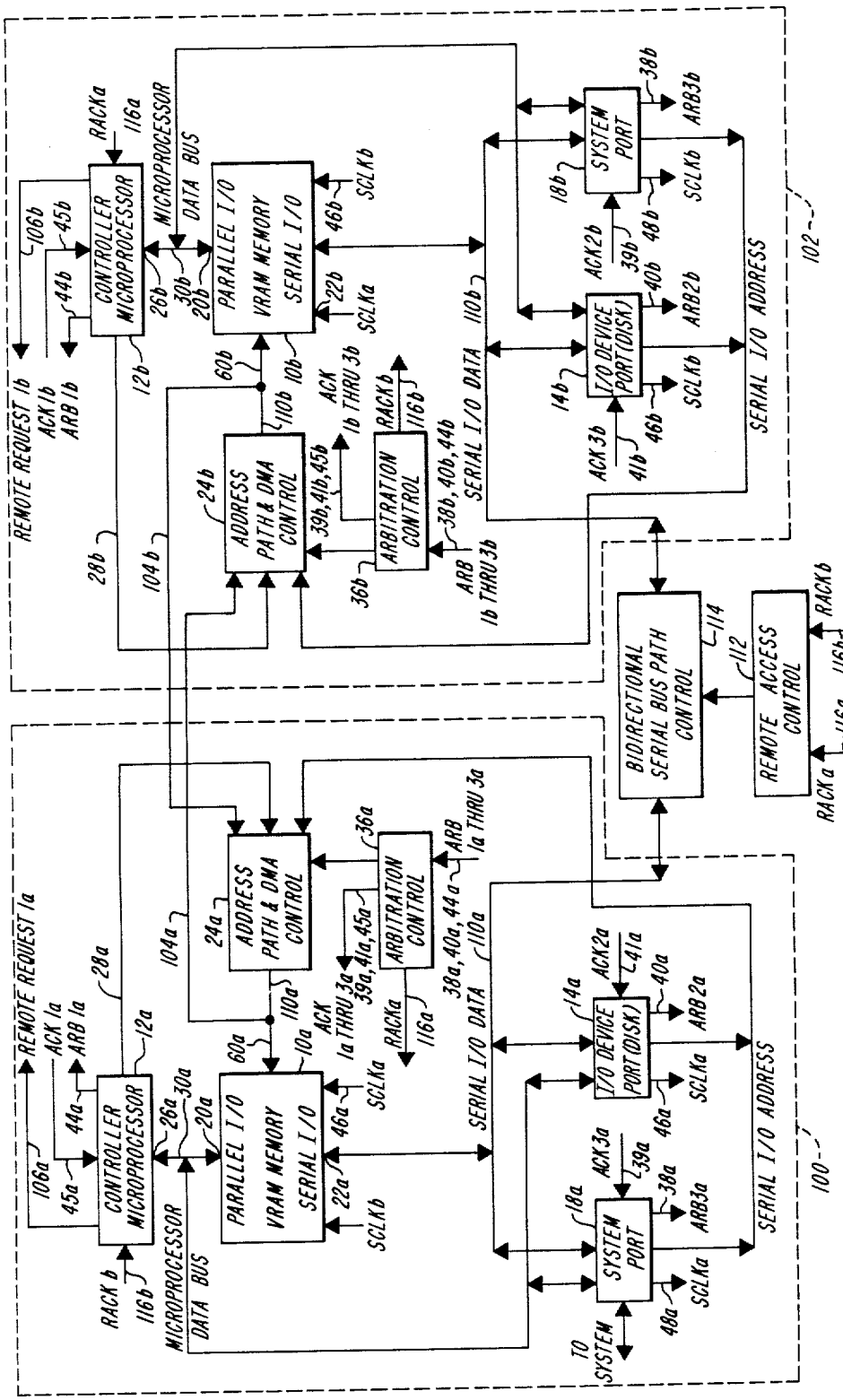
FIG. 2 is a electrical schematic block diagram of a second embodiment wherein a plurality of CPU elements share the VRAM in accordance with the invention.

In a related embodiment of the invention, because of the availability of stored data to several processing systems, the embodiment of FIG. 2 can also be employed in connection with a parallel processing system wherein each system can access and share data being generated by a different system. Thus, each processing system can read or update a different processing system storage memory in a burst mode data transfer, as illustrated herein above. More than two CPU systems can be interconnected in accordance with the operation of the embodiment illustrated in FIG. 2.

In accordance with the present invention therefore, the use of the VRAM in the illustrated embodiments eliminates the need for intermediate buffer storages (except as needed for burst mode transfers) between the various ports and the memory. This is due, in part, to the very high speed of the VRAM which has a shift in/out cycle time on the order of thirty nanoseconds. The illustrated embodiments further allow the CPU microprocessor to access data provided by a high speed disk without interrupting the flow of data either to or from the disk. In essence then, all data is equally accessible to the various I/O dependent elements sharing the memory.

Additions, subtractions, deletions, and other modifications of the described particular embodiments of the invention will be apparent to those practiced in the art and are within the scope of the following claims.

What is claimed is:

1. Apparatus for providing high speed data communications with a shared memory having a random access port and a sequential access port, said shared memory communicating with a first processing control unit and at least one auxiliary processing device, the processing control unit requiring random access of said memory, said apparatus comprising;
    means for operatively connecting the processing control unit to the random access port of said shared memory,
    means for operatively connecting each auxiliary processing device to the sequential access port of said shared memory, and
    means connected between said shared memory and each of said auxiliary processing devices as well as said processing control unit, for controlling access to said shared memory by said processing control unit and each said auxiliary processing device for effecting high speed communications at both said random access and said serial access ports.

2. The apparatus of claim 1 further comprising
    means for connecting a data bus path between said processing control unit and said auxiliary processing devices,
    means for connecting, along respective address buses, said processing control unit and said plurality of auxiliary processing devices to said control means for providing said control means with addresses for use in data transfers, and
    means for connecting said controlling means to said shared memory along a common address bus.

3. The apparatus of claim 2 wherein said controlling means further comprises
    an address path and direct memory access control circuitry responsive to said address data for generating a data address for transmission to said memory over said common address path, and
    an arbitration control circuitry responsive to arbitration signals available from each of said processing control unit and said plurality of auxiliary processing devices for selecting one of said unit and devices for transferring data to or receiving data from said shared memory.

4. The apparatus of claim 1 wherein said means for controlling access to said shared memory further comprises
    means for determining priority of access to said memory by said processing control unit and said plurality of auxiliary devices.

5. The apparatus of claim 1 wherein said shared memory is a video random access memory.

6. The apparatus of claim 1 further comprising
    a data bus path connected between the processing control unit and said auxiliary processing devices.

7. Apparatus for sharing data in a remote processing system with a local processing system, each processing system having a central processing unit and at least one auxiliary processing device, said apparatus comprising
    means for operatively connecting each of said central processing units to a respective data bus, means for connecting each said data bus to a random access port of a respective shared memory having a random access port and a sequential access port, means for connecting each said auxiliary processing device to a respective sequential data bus, means for connecting each said sequential data bus to a sequential access port of said respective shared memory, means for selectively interconnecting said respective sequential data buses, a local system memory control means for receiving address and priority request data from said local system central processing unit and for generating a remote address control data for the remote system shared memory, and remote memory control means responsive to said remote address control data and a remote request from said local central processing unit for activating said interconnecting means for allowing bidirectional data transfer between said local and remote processor systems, including writing data in and reading data from said remote shared memory by an auxiliary device of the local processor system.

8. A method for providing high speed data communications with a shared memory having a random access port and a sequential access port, said shared memory communicating with a first processing control unit and at least one auxiliary processing device, comprising the steps of;

connecting said processing control unit to the random access port of said shared memory, connecting each auxiliary processing device to said sequential access port of said shared memory, and controlling access to said shared memory by said processing control unit and each auxiliary processing device for effecting high speed communication at said random access and said sequential access ports.

9. The method of claim 8 further comprising the steps of prioritizing attempts to access said memory so that the access at said random access port takes highest priority.

10. The method of claim 8 wherein said controlling step comprises the steps of providing a common address path to said memory for addressing a first word of a memory transfer, and providing the memory with a block length when said address corresponds to a burst mode transfer of operation from one of said auxiliary processing devices.

11. The method of claim 8 further comprising the steps of connecting at least a second processing control unit to a random access port of a second shared memory, connecting at least a second auxiliary device to a sequential access port of said second shared memory, and controlling access to said shared memory connected to said first processing control unit by auxiliary devices connected to said second shared memory.

* * * * *